July 24, 1956 H. A. LESSARD 2,756,090
APPARATUS FOR HANDLING AND STORING SHEETS OF MATERIAL
Filed June 19, 1951
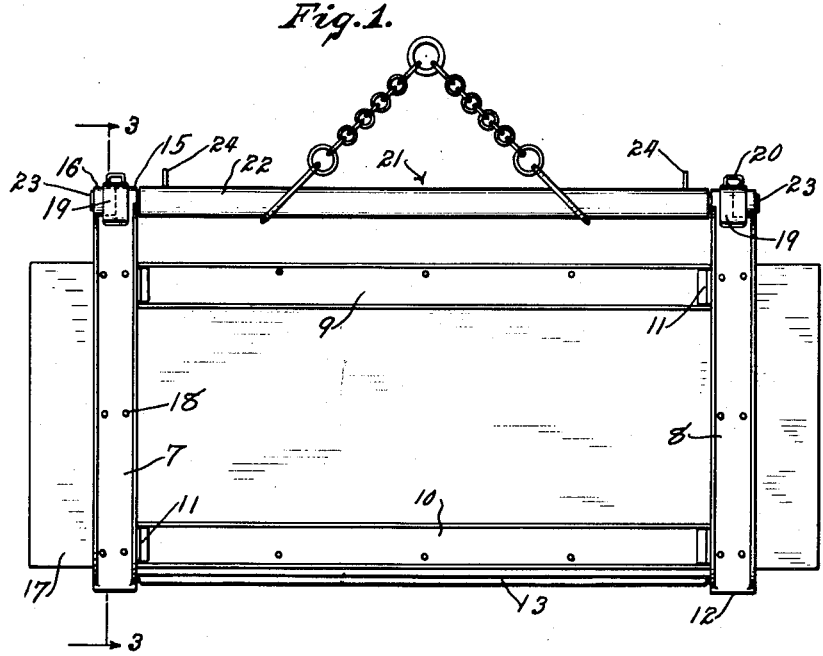
INVENTOR.
HERVE A. LESSARD.
BY Louis V. Lucia
ATTORNEY.

July 24, 1956  H. A. LESSARD  2,756,090
APPARATUS FOR HANDLING AND STORING SHEETS OF MATERIAL
Filed June 19, 1951  4 Sheets-Sheet 2
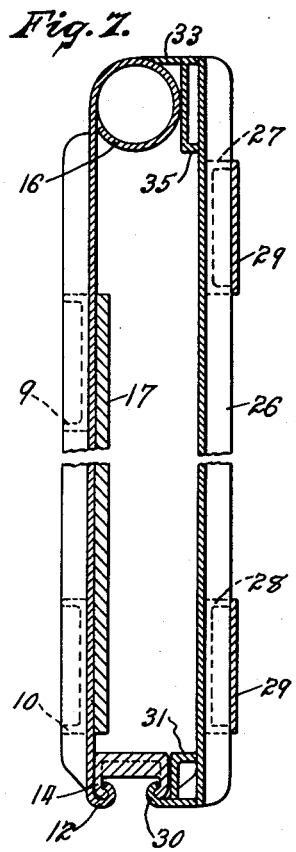
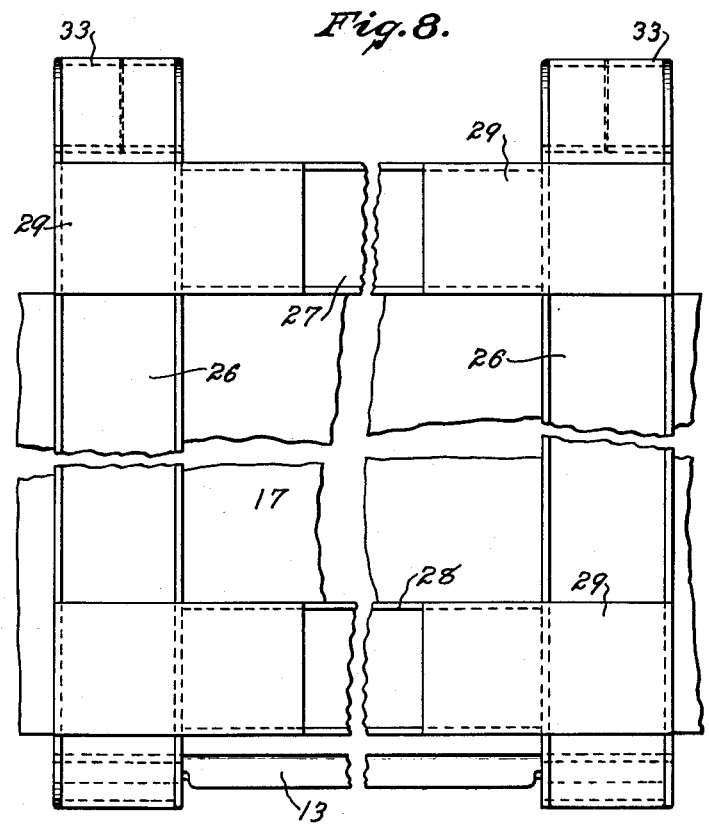
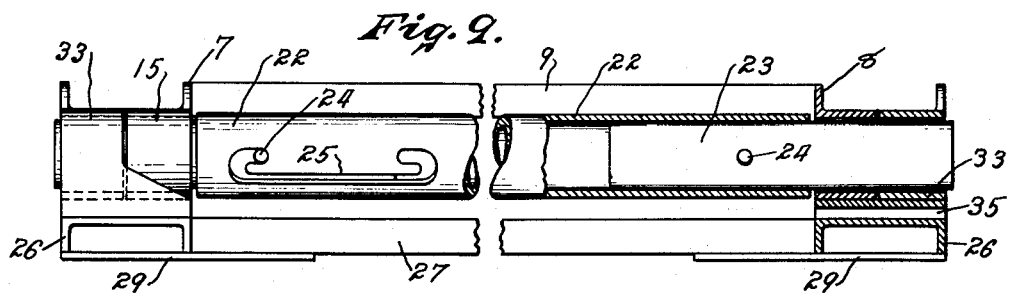
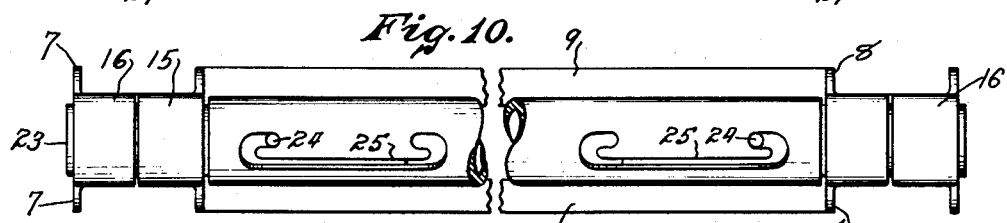
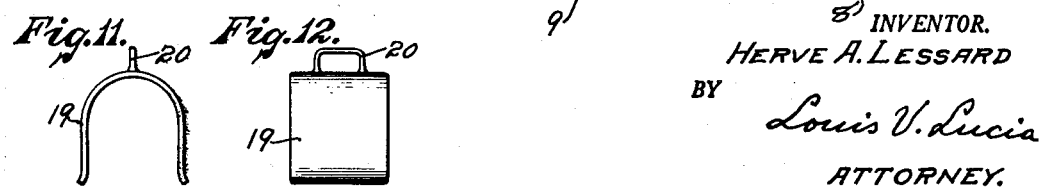
INVENTOR.
HERVE A. LESSARD
BY
Louis V. Lucia
ATTORNEY.

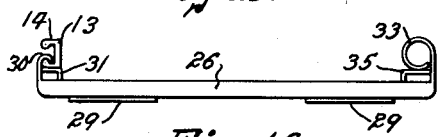
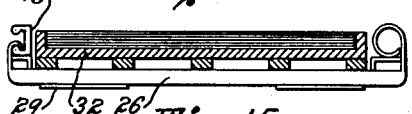
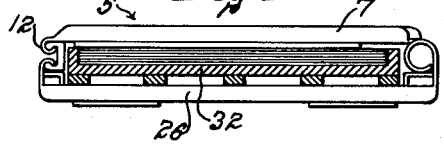
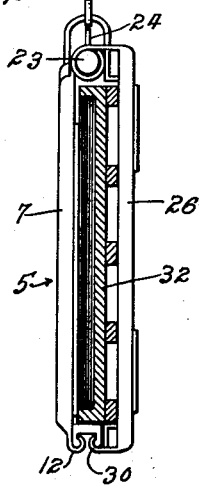
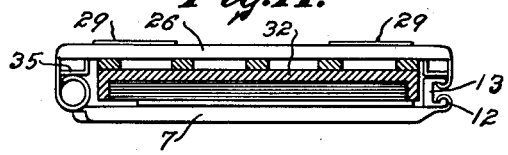
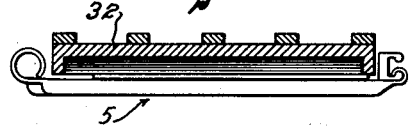
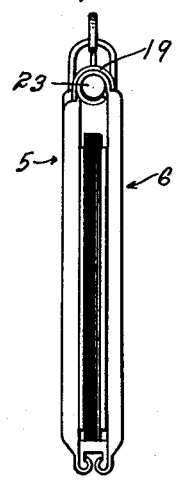
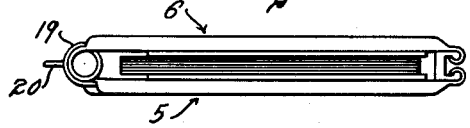
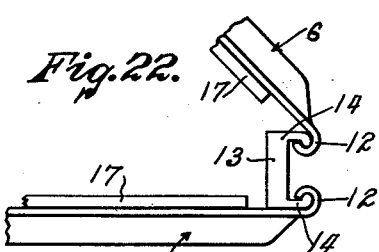
INVENTOR.
HERVE A. LESSARD.
BY
Louis V. Lucia
ATTORNEY.

July 24, 1956     H. A. LESSARD     2,756,090
APPARATUS FOR HANDLING AND STORING SHEETS OF MATERIAL
Filed June 19, 1951     4 Sheets-Sheet 4

INVENTOR.
HERVE A. LESSARD.
BY
*Louis V. Lucia*
ATTORNEY.

United States Patent Office 2,756,090
Patented July 24, 1956

2,756,090

APPARATUS FOR HANDLING AND STORING SHEETS OF MATERIAL

Herve A. Lessard, East Hartford, Conn.

Application June 19, 1951, Serial No. 232,304

8 Claims. (Cl. 294—67)

This invention relates to apparatus for handling and storing sheets of material such as heavy metal sheets and the like. It is well known by those experienced in the handling and storing of packs of metal sheets, that it is very difficult to handle and store such packs due to their heavy weight and also due to the fact that they are usually stored by stacking the packs on the floor, in order to economize floor space.

When the packs of sheet metal are thus stored, and it is desired to obtain one or more sheets from a pack which is stored under another pack, or several of them, the packs above the one from which the sheet is wanted first have to be removed in order to permit access to the desired sheet and this requires the expenditure of a considerable amount of time and labor. Also, due to the fact that passageways have to be provided between the stacks of sheet metal packs, a great amount of floor space is wasted.

The conventional manner of handling and storing sheet metals has been particularly objectionable in cases where it is frequently desired to remove a single sheet, or a piece thereof, for testing purposes before the entire pack is needed and this has resulted in a great deal of inconvenience and waste of time for the reason that it is often necessary to first remove several packs from above the one from which a sheet is wanted before access can be had to that sheet.

It is an object of this invention therefore to provide novel apparatus for handling and storing sheet metal in such a manner as to greatly facilitate the handling of the heavy packs of metal sheets so that they may be removed from their original shipping crate and deposited in a rack, from which the said sheets may be easily withdrawn as needed with full accessibility and without requiring the removal of other packs of material in order to render the sheets in the rack accessible.

It is a further object of this invention to provide an improved folder for containing the packs of sheets, which folder may be readily inserted into the rack and opened when desired to permit the removal of one or a number of sheets without requiring separate handling of the remaining sheets.

A still further object of this invention is the provision of a separate component for such a folder which is operative therewith to facilitate the transfer of the pack from the original crate into the said folder.

Further objects and advantages of my invention will be more clearly understood from the following description and the accompanying drawings in which:

Fig. 1 is a side view of my improved folder showing the same supported from a hoisting bar provided therefor.

Fig. 2 is an end view of the said folder shown in Fig. 1.

Fig. 3 is an enlarged sectional end view on line 3—3 of Fig. 1, with the fastening clips removed.

Fig. 4 is an enlarged side view of a portion of said folder.

Fig. 5 is a side view of one of the upright members used in the construction of said folder.

Fig. 6 is a sectional side view of an end portion of the bottom bar of the folder.

Fig. 7 is a view similar to Fig. 3 but showing the use of the transfer frame used in connection with said folder.

Fig. 8 is a side view of the folder and transfer frame as shown in Fig. 7.

Fig. 9 is a plan view showing the said folder and transfer frame as in transit.

Fig. 10 is a plan view showing my improved folder while in transit.

Fig. 11 is an end view of the holding clip used in connection with said folder.

Fig. 12 is a side view of said clip.

Fig. 13 is an end view of the transfer frame.

Fig. 14 is a similar view showing a shipping crate in section with a pack of metal sheets therein and in upright position on said transfer frame.

Fig. 15 is a similar view showing a portion of the folder attached to the transfer frame.

Fig. 16 is an end view showing the said folder portion, frame and crate in an upright position as it is being inverted with the hoist bar attached thereto.

Fig. 17 is an end view showing the said folder portion, frame and crate in an inverted position upon the floor.

Fig. 18 is a similar view showing the side member of the folder with the crate inverted thereon and the transfer rack removed therefrom.

Fig. 19 is a similar view showing the crate removed and the pack remaining upon the side member of the folder.

Fig. 20 is a similar view showing the other side member attached to the folder and held in closed position by means of the holding clips.

Fig. 21 is an end view showing the closed folder being moved to the floor rack by the hoist.

Fig. 22 is an end view of a bottom portion of the folder and showing the side members assembled to the bottom bar.

Figure 23:
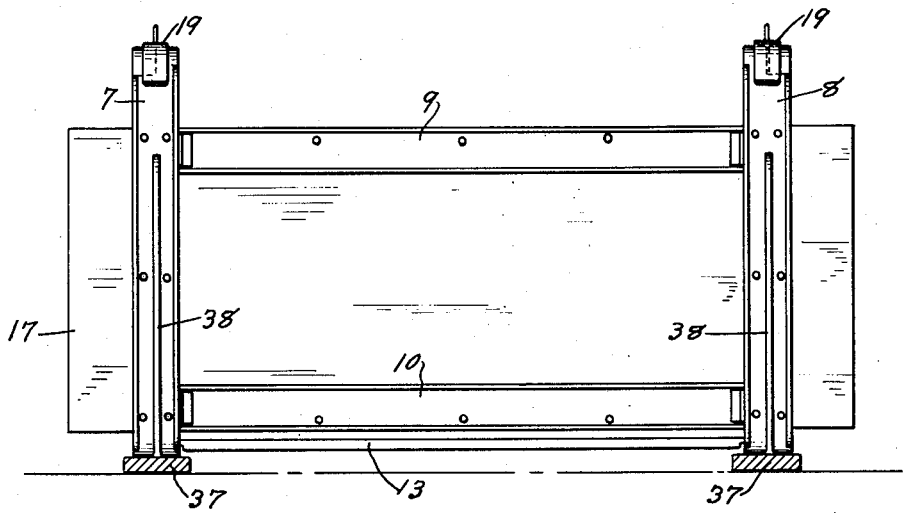
Fig. 23 is an end view of a floor rack for storing the said sheets and showing one of the folders in position therein.

As shown in the accompanying drawings, the folder included in my invention is preferably constructed of an opposed pair of sides generally indicated at 5 and 6. Each of these sides consists of a frame that is constructed of channel irons and includes upright end bars 7 and 8 which are joined together by intermediate upper and lower horizontal bars 9 and 10, respectively. These bars are preferably secured to the end bars 7 and 8 by welding or the like and corner fastening pieces 11 may also be used if desired.

The lower end of each of the bars 7 and 8 is bent inwardly to provide a hook portion 12 by means of which the said sides are pivotally secured to a common bottom bar 13 which has, along the sides thereof, downwardly depending parallel flanges 14 with inwardly bent portions adapted to be received in the hook portions 12 for swivelly and detachably securing the sides 5 and 6 to the said bottom bar.

The upper end of each of the end bars 7 and 8 is looped inwardly so as to provide the loops 15 and 16, respectively, which are in axial alignment when the folder is in closed position in order to receive a hoist bar as will be hereinafter more fully described.

Each of the said side members 5 and 6 has secured thereto a suitable wall member, or liner 17, which is attached to the inside of the side member by means of suitable fasteners 18.

The above described folder may be retained in closed position by means of U-shaped clips 19 which have a handle 20 and are placed over the looped portions of the end bars 7 and 8 so as to straddle the adjacent loops of the opposed end bars and retain the folder in closed position.

In order to facilitate the moving of the said folder by means of a hoist or the like, I provide a hoist bar, generally indicated at 21, which is constructed of a tubular portion 22 having, at each end thereof, a bolt bar 23 which is slidable in the end of the said tubular portion and may be projected from the said bar through the loops 15 and 16 of the end members when the folder is closed and the said loops are axially aligned as shown particularly in Figs. 9 and 10. Each of said bolt bars has a handle 24 which extends through an elongated slot 25 in the tubular portion 22, and by means of which the bolt bar may be moved. The ends of the said slot are hooked, as shown in Figs. 9 and 10, so as to lock the bolt in either projected or retracted position.

As clearly illustrated in Figs. 7 to 9, the embodiment of my present invention also includes a transfer frame which may be used in combination with the above described folder for transferring a pack of sheets from their original shipping crate into said folder. This transfer frame is somewhat similar to a side of the folder and is constructed of vertical end bars 26—26 and upper and lower horizontal bars 27 and 28, respectively, which are secured to the said end bars. At each corner of the transfer frame there is provided a foot plate 29 which overlaps the end portions of the horizontal bars and the adjacent vertical bar and is secured thereto to reinforce the said frame and also provide feet for supporting the frame on a floor or a like surface.

Each of the end bars 26—26 is provided at its lower end with a hook portion 30 which extends inwardly from said bar and is adapted to engage the hooked flange 14 of the bottom bar 13. A spacer 31 is provided between the bar 26 and the hook portion 14 to space the frame from the bottom bar so as to accommodate the additional thickness of the bottom of a shipping crate 32 which is received upon said frame during the operation of transferring the sheets from the crate into the folder.

At the top of each bar 26 there is provided a looped portion 33 which cooperates with the adjacent loop 15 of the opposite folder side to receive the bolt bar 23 of the hoist bar 22 in the manner above described. Adjacent to the said loop portion 33 there is also provided a spacer 35 which cooperates with the spacer 31 for spacing the transfer frame to compensate for the thickness of the bottom of the crate.

The hook portions 12 and 30 of the folder sides and the transfer frame respectively, are adapted to be disconnected from the hooked flanges 14 by simply swinging the side or frame to an angle of approximately forty-five degrees to the bottom bar, as shown in Fig. 22, and then sliding the said side or frame downwardly to separate the hook portion from the bar. It will be noted that when the said side or frame is in its normal closed position, as shown particularly in Figs. 3 and 7, the hook portion cannot become disengaged from the flange due to the enlargement at the end of the flange.

Figure 24:
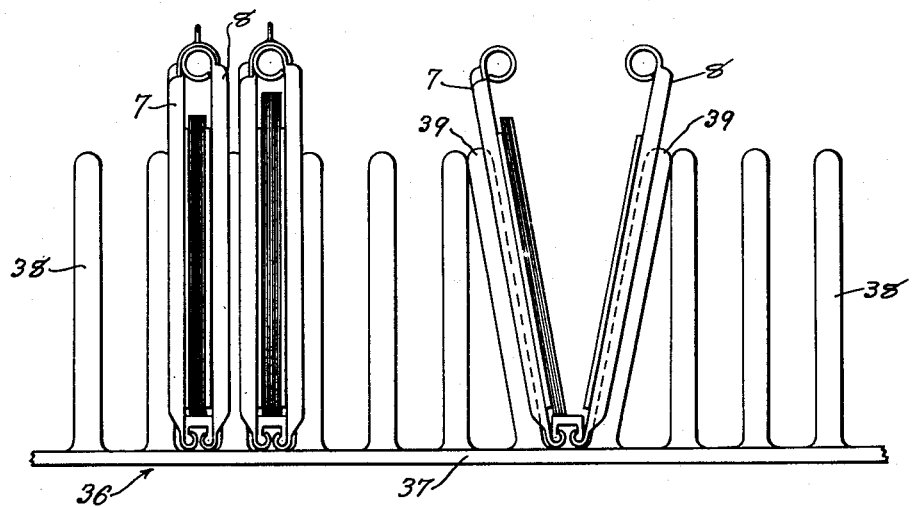
Fig. 24 is a side view of a portion of the floor rack showing folders therein and one of the folders in open position.

As illustrated in Figs. 23 and 24, I provide a floor rack 36 which consists of a pair of spaced parallel floor bars 37—37 having thereon a plurality of spaced vertical posts 38 that are preferably flat in cross-section and adapted to fit between the side flanges of the vertical end bars 7 and 8 of the folder sides. The said bars 38 are spaced so as to receive the said folders therebetween and support them in closed position on the lower ends of the said vertical bars, as clearly shown in Fig. 24. In addition, the spaced rows of vertical bars 38 are provided, at desired intervals, with sets of bars 39—39 which are disposed at an angle to each other to form a V for receiving a folder and permitting it to be opened, as also shown in Fig. 24, so as to render the sheets therein accessible for removal from the folder.

In the novel method of handling and storing heavy sheets of material with my improved apparatus, the following steps are performed, as illustrated in Figs. 13 to 21:

1. The transfer frame is first placed on the floor and the bottom bar is attached thereto, as shown in Fig. 13.
2. The crate with the sheet material therein is then placed upon the transfer frame, as shown in Fig. 14.
3. A folder side is then attached to the bottom bar and laid upon the material in the crate, as shown in Fig. 15.
4. The hoist bar is then connected and the entire assemblage is hoisted from the floor, as shown in Fig. 16.
5. The said assemblage is inverted and placed on the floor in reverse position and the hoist bar is detached therefrom, as shown in Fig. 17.
6. The transfer frame is then detached and removed from the assemblage, leaving the crate in upside down position upon the side of the folder, as shown in Fig. 18.
7. The crate is then removed, leaving the pack of sheets upon the side of the folder, as in Fig. 19.
8. The other side of the folder is then attached to the bar and placed upon the upper side of the pack of sheets, and the folder is secured in closed position by attaching one of the clips 19 over the adjacent loops 15 and 16 of each opposed set of end bars, as shown in Fig. 20.
9. The hoist bar is then connected to the closed folder and the entire folder is lifted, as shown in Fig. 21, and deposited into the floor rack for storage, as shown in Figs. 23 and 24.

When it is desired to draw the sheets of material from the folders in the said floor rack, the particular folder is lifted by the hoist and placed between the angled bars 39—39. The clips 19 are then removed, the folder is opened as shown in Fig. 24 and free access is thereby provided to the sheets contained within said folder. When desired, the said folder may be again closed and returned to its stored position in the said rack until more sheets are neeeded.

From the above description it will be clearly understood, particularly by those skilled in the art, that my invention provides a novel apparatus for handling and storing sheet material which will greatly facilitate the handling of heavy sheets of material as well as materially reduce the amount of space required for storing them. In addition, my invention will greatly facilitate the procurement of the desired sheets from a stored supply by rendering the said sheets directly accessible at all times, without necessitating the removal of other packs of sheets before access can be gained to those desired.

I claim:

1. A folder for containing sheets of material comprising an elongated bottom bar having parallel flanges depending from opposite sides thereof adjacent the end portions of said bar, a pair of opposed sides for said folder, each of said sides comprising upright end bars, upper and lower horizontal bars connecting said end bars, an inwardly extending hook portion at the lower end of each of said end bars adapted to detachably engage one of said depending flanges of the bottom bar for hingedly connecting the sides to said bottom bar, and an inwardly extending loop at the upper end of each of the end bars of said sides disposed on a common axis with the cooperating loop of the opposite side to receive a hoisting bar which extends through said loops for hoisting the folder and detachably retaining it in closed position.

2. Apparatus for handling and storing sheet material including a folder for said material comprising a bottom bar, a pair of opposed sides each comprising a frame constructed of vertical end bars and connecting upper and lower horizontal bars, each of said vertical bars having at the lower ends thereof a hook portion whereby the side is swivelly connected to the bottom bar and, at the upper ends thereof, an inwardly extending loop disposed on a common axis with a cooperating loop of the corresponding bar for the opposite side, and a hoist bar having extendable bolt members adapted to be projected through the said loops for securing and hoisting the folder in closed position.

3. Apparatus for handling and storing sheet material as set forth in claim 2 wherein the said hoisting bar comprises a tubular portion having at each end thereof a bolt bar slidable in said tubular portion and adapted to be projected therefrom through the loops of the opposite folder sides, and a handle on each of said bolt bars projecting through a slot in said tubular portion to permit manual operation of said bolt bars.

4. Apparatus for handling and storing sheet material including a container for said material comprising a bottom bar, a side hingedly and detachably secured to one side of said bottom bar, and a transfer frame similarly secured to the opposite side of the bottom bar and spaced therefrom at a greater distance than the said side, the said transfer frame comprising a pair of vertical end bars each having, at the lower end thereof, an inwardly extending hook portion adapted to receive a cooperating hook portion of the bottom bar and, at the upper end thereof, an inwardly extending loop cooperating with a loop on the said side to detachably secure the side and frame in relatively closed position, and a spacer adjacent to each of said hook portions and loops for spacing the said transfer frame from the bottom bar and from the loop of the opposite side.

5. Apparatus for handling and storing sheet material including a folder comprising a bottom bar, a side hingedly and detachably secured to the said bottom bar at one side thereof, a transfer frame adapted to be similarly secured to the bottom bar at the opposite side thereof, the said transfer frame being spaced from the bottom bar at a greater distance than said side, and inwardly extending cooperating loops on said side and transfer frame for receiving a hoisting member for relatively retaining said side and transfer frame in closed position.

6. Apparatus for handling and storing sheets of material including a folder comprising an elongated bottom bar, a pair of opposed sides detachably secured at the lower portion thereof to the opposite sides of said bottom bar, and opposed inwardly extending loops on the upper portions of said sides detachably connectable for securing the said folder in closed position.

7. Apparatus for handling and storing sheets of material including a folder comprising an elongated bottom bar having parallel depending flanges at opposite sides thereof, a pair of sides each having a hook portion engageable with one of said flanges for detachably securing the side to the bottom bar, and means including inwardly extending opposed loops between the said sides for detachably securing the folder in closed position.

8. Apparatus for handling and storing sheet material including a folder comprising an elongated bottom bar having depending parallel flanges along the opposite sides thereof, a pair of sides, each of said sides being constructed with vertical end bars each having at the lower end thereof an inwardly extending hook portion adapted to engage one of said depending flanges on the bottom bar and detachably secure the side thereto, upper and lower horizontal bars extending between said end bars, and inwardly extending loops on each of said end bars, the said loops on one of said sides being alignable with the loops of the other side to receive a hoisting bar for hoisting said folder and detachably retaining it in closed position.

References Cited in the file of this patent

UNITED STATES PATENTS

| | | |
|---|---|---|
| 1,097,619 | Fuller | May 26, 1914 |
| 1,377,667 | Cary | May 10, 1921 |
| 2,290,715 | Shanahan et al. | July 21, 1942 |
| 2,457,842 | Smith et al. | Jan. 4, 1949 |
| 2,467,113 | Deiters | Apr. 12, 1949 |
| 2,540,378 | Restetsky | Feb. 6, 1951 |

FOREIGN PATENTS

| | | |
|---|---|---|
| 207,661 | Germany | Mar. 5, 1909 |
| 494,417 | Belgium | Mar. 31, 1950 |
| 589,783 | Great Britain | June 30, 1947 |